United States Patent
Cho et al.

(10) Patent No.: US 10,693,147 B2
(45) Date of Patent: Jun. 23, 2020

(54) FUEL CELL AND METHOD FOR MANUFACTURING SAME

(71) Applicant: LG CHEM, LTD., Seoul (KR)

(72) Inventors: Jun Yeon Cho, Daejeon (KR); Sang Hoon Kim, Daejeon (KR); Gyo Hyun Hwang, Daejeon (KR); Kwanghyun Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 669 days.

(21) Appl. No.: 15/034,304

(22) PCT Filed: Nov. 7, 2014

(86) PCT No.: PCT/KR2014/010703
§ 371 (c)(1),
(2) Date: May 4, 2016

(87) PCT Pub. No.: WO2015/069069
PCT Pub. Date: May 14, 2015

(65) Prior Publication Data
US 2016/0301085 A1    Oct. 13, 2016

(30) Foreign Application Priority Data
Nov. 8, 2013  (KR) .................. 10-2013-0135491

(51) Int. Cl.
| | |
|---|---|
| *H01M 4/92* | (2006.01) |
| *H01M 4/86* | (2006.01) |
| *H01M 4/90* | (2006.01) |
| *H01M 4/88* | (2006.01) |
| *H01M 8/1004* | (2016.01) |
| *H01M 8/1018* | (2016.01) |

(52) U.S. Cl.
CPC ......... *H01M 4/921* (2013.01); *H01M 4/8642* (2013.01); *H01M 4/8647* (2013.01); *H01M 4/8652* (2013.01); *H01M 4/8657* (2013.01); *H01M 4/88* (2013.01); *H01M 4/9041* (2013.01); *H01M 4/9083* (2013.01); *H01M 8/1004* (2013.01); *H01M 4/8825* (2013.01); *H01M 2008/1095* (2013.01)

(58) Field of Classification Search
CPC .. H01M 4/921; H01M 4/8842; H01M 4/8642; H01M 4/8652; H01M 4/8657; H01M 4/88; H01M 8/1004
USPC ...................................................... 429/482
See application file for complete search history.

(56) References Cited

U.S. PATENT DOCUMENTS

| | | | |
|---|---|---|---|
| 2013/0137009 A1 | 5/2013 | Jin et al. | |
| 2013/0177838 A1 | 7/2013 | Wang et al. | |
| 2015/0376803 A1* | 12/2015 | Wang ................. | H01M 4/8605 429/480 |

FOREIGN PATENT DOCUMENTS

| | | |
|---|---|---|
| CN | 101108346 | 1/2008 |
| CN | 101185900 | 5/2008 |
| CN | 101702437 | 5/2010 |

(Continued)

OTHER PUBLICATIONS

Hu Synthesis of graphene-supported hollow Pt—Ni nanocatalysts for highly active electrocatalysis toward the methanol oxidation reaction, Electrochimica Acta, vol. 85, Dec. 15, 2012, pp. 314-321 (Year: 2012).*

(Continued)

*Primary Examiner* — Olatunji A Godo
(74) *Attorney, Agent, or Firm* — Dentons US LLP

(57) ABSTRACT

The present specification relates to a fuel cell and a method for manufacturing the same.

16 Claims, 5 Drawing Sheets

(56) References Cited

FOREIGN PATENT DOCUMENTS

| CN | 101807701 | | 8/2010 | |
|---|---|---|---|---|
| CN | 102280647 | | 12/2011 | |
| JP | 2013536065 | A | 9/2013 | |
| KR | 1022060108819 | A | 10/2006 | |
| KR | 101030046 | B1 | 4/2011 | |
| KR | 1020130060119 | A | 6/2013 | |
| KR | 1020130093264 | A | 8/2013 | |
| WO | WO-2010108837 | A1 * | 9/2010 | ............ B22F 1/0022 |

OTHER PUBLICATIONS

Kim ("Facile fabrication of hollow Pt/ Ag nanocomposites having enhanced catalytic properties", Applied Catalysis B: Environmental, vol. 103, Issues 1-2, Mar. 14, 2011, pp. 253-260) (Year: 2011).*

Kim M. R. et al., "Facile fabrication of hollow Pt/Ag nanocomposites having enhanced catalytic properties," Applied Catalysis B: Environmental 103: 253-260 (2011).

Zhao et al., "Methanol electro-oxidation on Ni@Pd core-shell nanoparticles supported on multi-walled carbon nanotubes in alkaline media," Intern. Journ. of Hydrogen Energy 35: 3249-3257 (2010).

Heinz Fissan et al: "Comparison of different characterization methods for nanoparticle dispersions before and after aerosolization", Analytical Methods, vol. 6, No. 18, Jul. 15, 2014, p. 7324.

T Allen: "Particle size measurement Mar. 11, 2006 A. Trunschke Further reading Modern Methods in Heterogeneous Catalysis Research", Dynamic Light Scattering Handbook of Heterogeneous Catalysis, Jan. 1, 1994.

* cited by examiner

[Figure 1]
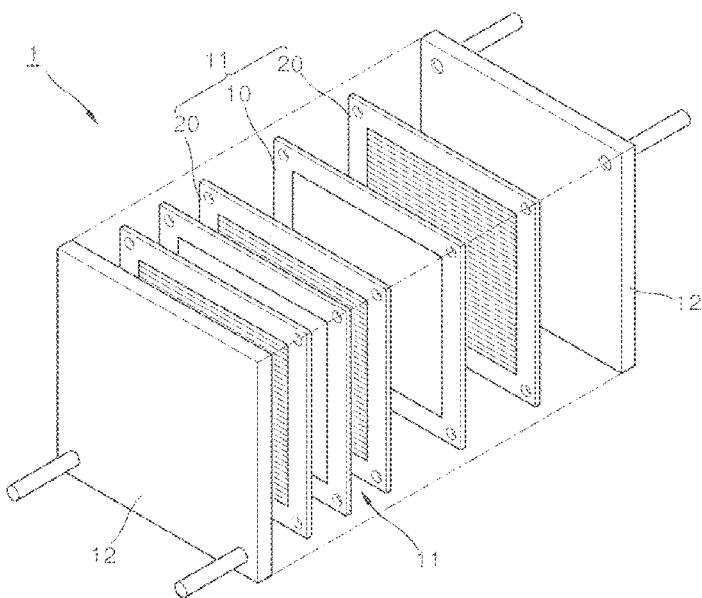
[Figure 2]
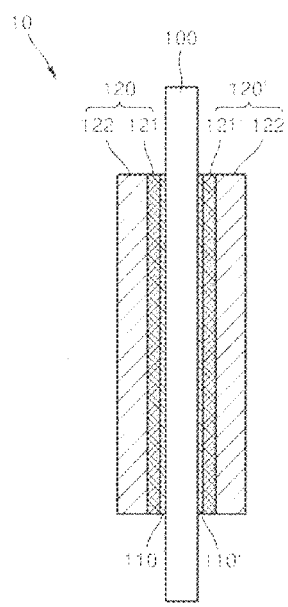

[Figure 3]
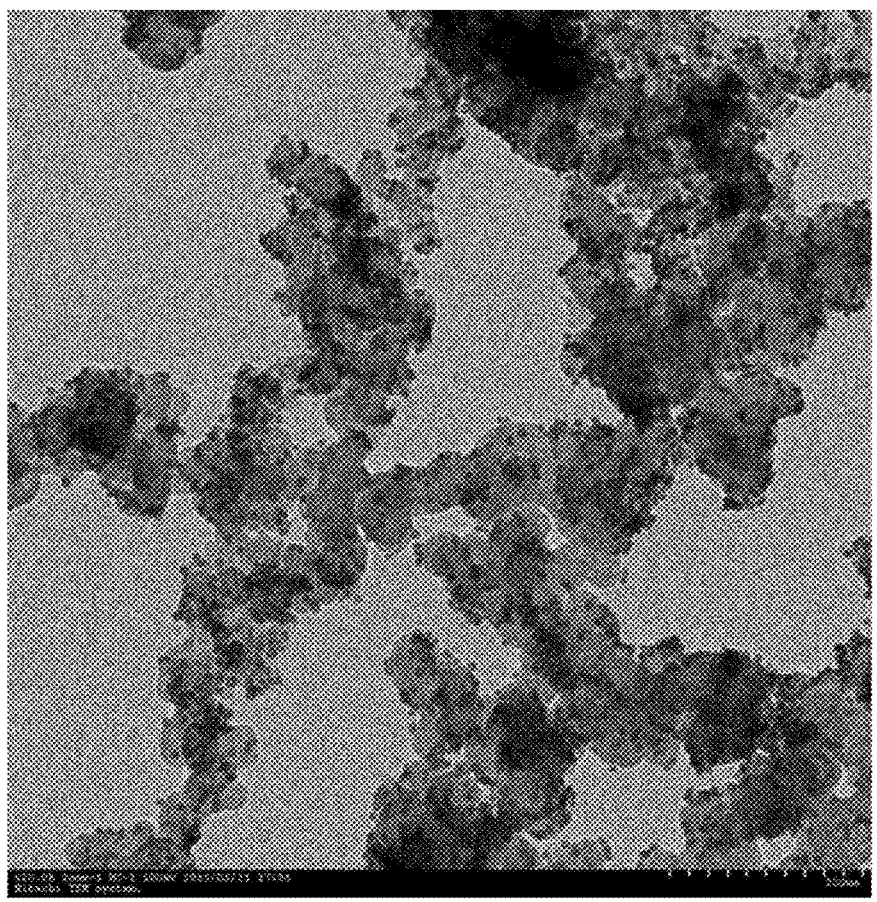

[Figure 4]
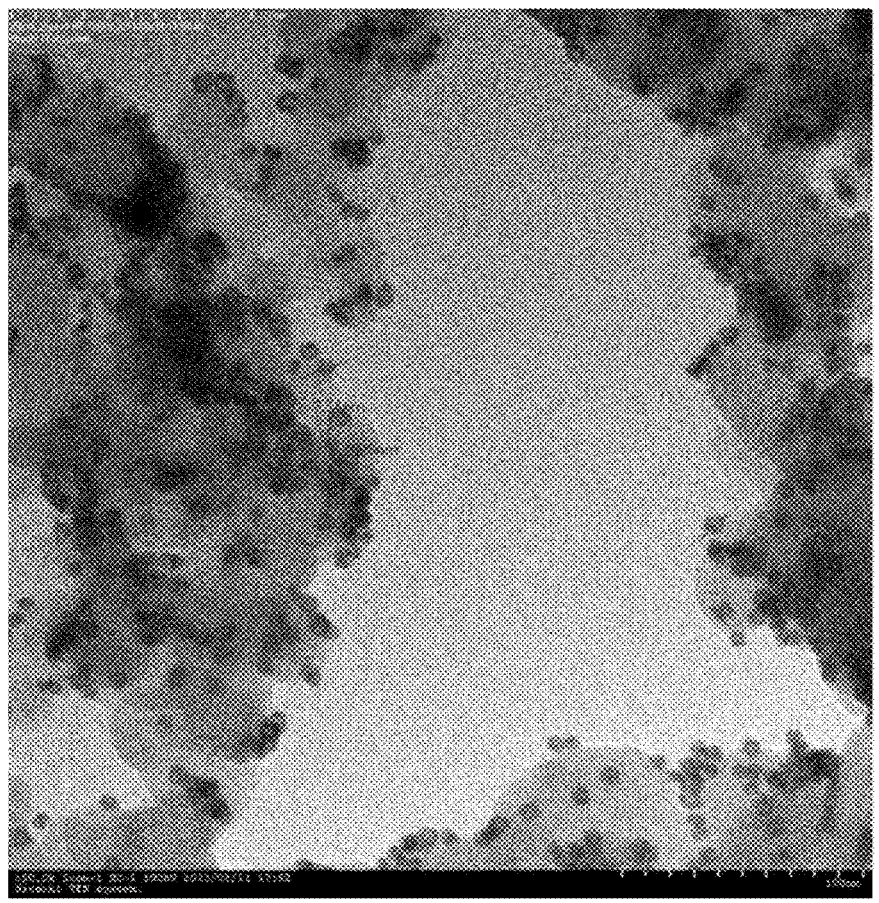

[Figure 5]
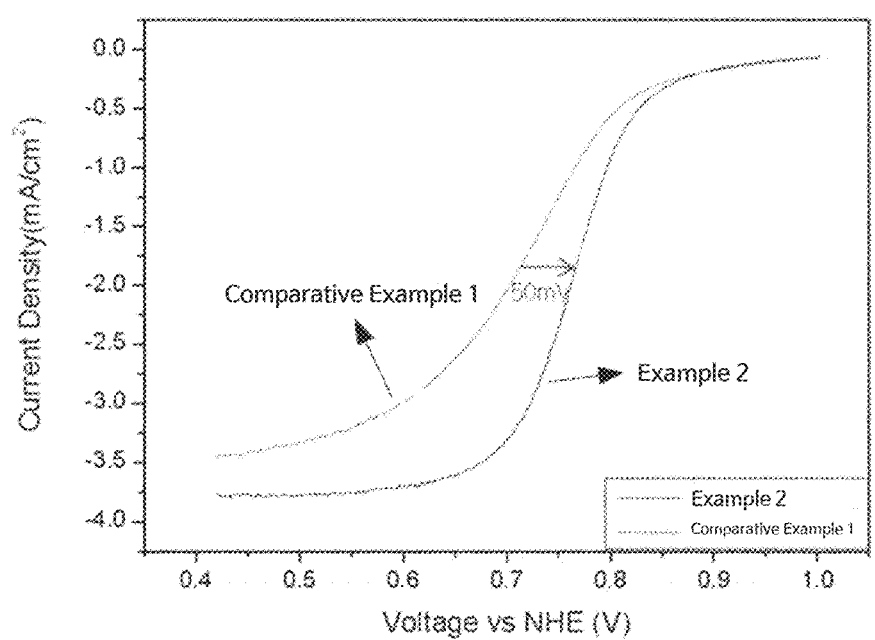

[Figure 6]
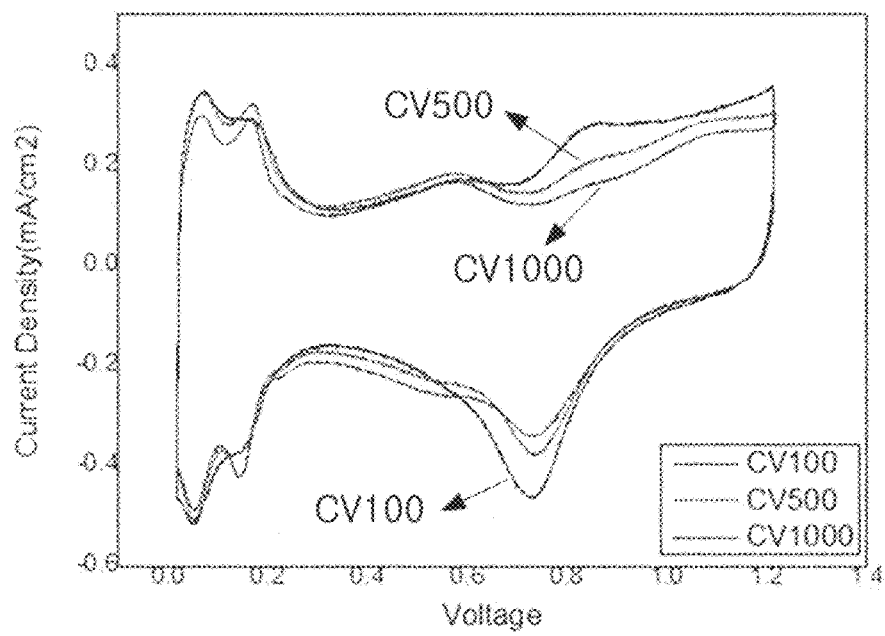
[Figure 7]
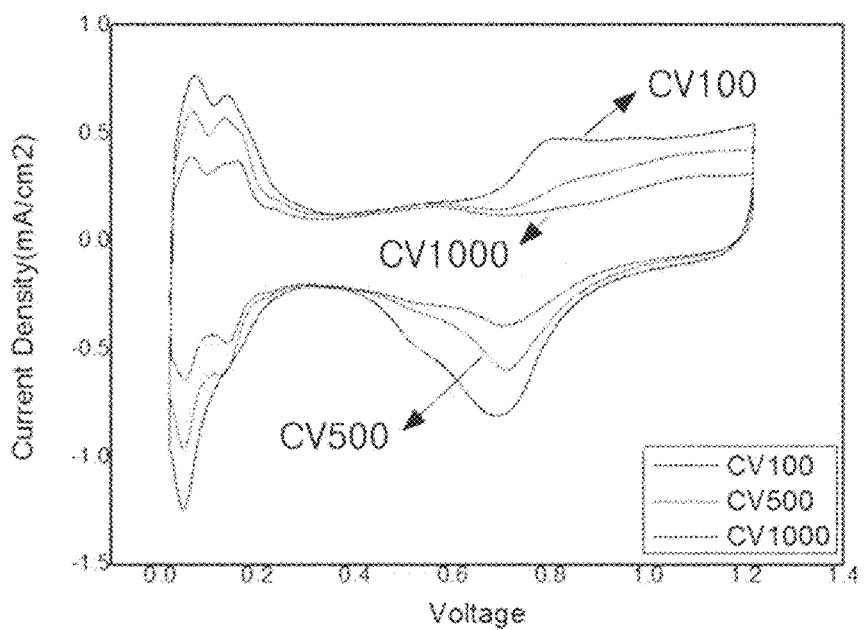

FUEL CELL AND METHOD FOR MANUFACTURING SAME

TECHNICAL FIELD

This application is a National Stage Entry of International Application No. PCT/KR2014/010703, filed on Nov. 7, 2014, and claims the benefit of and priority to Korean Application No. 10-2013-0135491, filed on Nov. 8, 2013, both of which are incorporated herein by reference in their entirety for all purposes as if fully set forth herein.

The present specification relates to a fuel cell and a method for manufacturing the same.

BACKGROUND ART

Fuel cells are a highly efficient and pollution free power generating device directly converting chemical energy of reactants to electrical energy, and are currently used in power plants for households or electric vehicles, and are also used in various fields for industrial uses, military uses and the like. Fuel cells are divided into a molten carbonate fuel cell (MCFC), a solid oxide fuel cell (SOFC), an alkali fuel cell (AFC), a phosphoric acid fuel cell (PAFC), a polyelectrolyte fuel cell (PEMFC), a direct methanol fuel cell (DMFC) and the like depending on an electrolyte, an operating temperature and a fuel type. Among these fuel cells, a polyelectrolyte fuel cell has excellent energy conversion efficiency and is capable of obtaining high current density even at low temperatures, and therefore, development thereof for application in various fields have been actively progressed.

Performance of a polyelectrolyte fuel cell is highly influenced by performance of a membrane electrode assembly catalyst of the fuel cell, and platinum (Pt), one of the raw materials, greatly affects fuel cell costs due to its very high price. Accordingly, researches and developments on catalysts for enhancing fuel cell performance and reducing costs have been substantially carried out.

For increasing activity of a fuel cell catalyst, researches on preparing platinum in a nano size and researches on supporting platinum in a highly dispersed manner and in a high ratio on carbon having a high surface area have been progressed. In addition, researches on using an alloy with other metals have been carried out in order to reduce platinum content, which accounts most of fuel cell costs.

PRIOR ART DOCUMENTS

Patent Documents

Korean Patent Application Laid-Open Publication No. 10-2006-0082595

DISCLOSURE

Technical Problem

The present specification relates to a fuel cell and a method for manufacturing the same.

Technical Solution

One embodiment of the present specification provides a fuel cell including a cathode; an anode; and an electrolyte membrane provided between the cathode and the anode, wherein at least one of the cathode and the anode includes an electrode catalyst, the electrode catalyst includes hollow metal nanoparticles including a hollow core unit; and a shell unit including a first metal and a second metal, and the hollow metal nanoparticles have an average particle diameter of 30 nm or less.

Another embodiment of the present specification provides a method for manufacturing a fuel cell including preparing an electrode catalyst including hollow metal nanoparticles that include a hollow core unit; and a shell unit including a first metal and a second metal; preparing an electrolyte membrane; forming a cathode on one surface of the electrolyte membrane; and forming an anode on the other side of the electrolyte membrane, wherein the hollow metal nanoparticles have an average particle diameter of 30 nm or less, and at least one of the forming of a cathode and the forming of an anode uses the electrode catalyst.

Advantageous Effects

An electrode catalyst of a fuel cell according to one embodiment of the present specification exhibits excellent activity compared to carbon-supported platinum having the same mass even when using a small quantity of platinum (Pt).

An electrode catalyst of a fuel cell according to one embodiment of the present specification has excellent oxygen reduction activity.

An electrode catalyst of a fuel cell according to one embodiment of the present specification has excellent durability. Specifically, an electrode catalyst according to one embodiment of the present specification is capable of maintaining excellent oxygen reduction activity even after operating a fuel cell for a long period of time.

An electrode catalyst of a fuel cell according to one embodiment of the present specification is capable of being prepared at room temperature, and therefore, is capable of simplifying the process and lowering manufacturing costs.

An electrode catalyst of a fuel cell according to one embodiment of the present specification is capable of using water as a solvent instead of an organic solvent, and therefore, has an advantage of not requiring a post treatment process treating the organic solvent. Furthermore, with an electrode catalyst of a fuel cell according to one embodiment of the present specification, effects of cost savings and environmental pollution prevention can be expected.

DESCRIPTION OF DRAWINGS

FIG. 1 is an exploded perspective view representing one embodiment of a fuel cell.

FIG. 2 is a cross-sectional schematic diagram of a membrane electrode assembly (MEA) forming the fuel cell of FIG. 1.

FIG. 3 and FIG. 4 are transmission electron microscopy (TEM) images of an electrode catalyst prepared according to Example 1.

FIG. 5 shows ORR measurement results according to Example 2 and Comparative Example 1.

FIG. 6 shows a result of measuring durability of an electrode catalyst according to Example 3.

FIG. 7 shows a result of measuring durability of an electrode catalyst according to Comparative Example 2.

MODE FOR DISCLOSURE

In the present specification, a description of a certain part "including" certain constituents means capable of further including other constituents, and does not exclude other constituents unless particularly stated on the contrary.

Hereinafter, the present specification will be described in more detail.

One embodiment of the present specification provides a fuel cell including a cathode; an anode; and an electrolyte membrane provided between the cathode and the anode, wherein at least one of the cathode and the anode includes an electrode catalyst, the electrode catalyst includes hollow metal nanoparticles including a hollow core unit; and a shell unit including a first metal and a second metal, and the hollow metal nanoparticles have an average particle diameter of 30 nm or less.

According to one embodiment of the present specification, the hollow metal nanoparticles may have an average particle diameter of 30 nm or less, more specifically 20 nm or less, 12 nm or less or 10 nm or less. Alternatively, the hollow metal nanoparticles may have an average particle diameter of 6 nm or less. The hollow metal nanoparticles may have an average particle diameter of 1 nm or greater. When the hollow metal nanoparticles have a particle diameter of 30 nm or less, an advantage of using the nanoparticles in various fields is high. In addition, the hollow metal nanoparticles having a particle diameter of 20 nm or less is more preferable. In addition, when the hollow metal nanoparticles have a particle diameter of 10 nm or less or 6 nm or less, the particles have a larger surface area, and consequently, there is an advantage in that applicability in various fields is more enhanced. For example, when the hollow metal nanoparticles formed with the above-mentioned particle diameter range are used, the efficiency may be significantly enhanced.

According to one embodiment of the present specification, an average particle diameter of the hollow metal nanoparticles means a value obtained after measuring particle diameters for 200 or more hollow metal nanoparticles using a graphic software (MAC-View), and then measuring an average particle diameter through the obtained statistical distribution.

According to one embodiment of the present specification, the hollow metal nanoparticles may have an average particle diameter of greater than or equal to 1 nm and less than or equal to 30 nm.

According to one embodiment of the present specification, the hollow metal nanoparticles may have an average particle diameter of greater than or equal to 1 nm and less than or equal to 20 nm.

According to one embodiment of the present specification, the hollow metal nanoparticles may have an average particle diameter of greater than or equal to 1 nm and less than or equal to 12 nm.

According to one embodiment of the present specification, the hollow metal nanoparticles may have an average particle diameter of greater than or equal to 1 nm and less than or equal to 10 nm.

According to one embodiment of the present specification, the hollow metal nanoparticles may have an average particle diameter of greater than or equal to 1 nm and less than or equal to 6 nm.

According to one embodiment of the present specification, the shell unit in the hollow metal nanoparticles may have a thickness of greater than 0 nm and less than or equal to 5 nm, and more specifically greater than 0 nm and less than or equal to 3 nm.

For example, the hollow metal nanoparticles may have an average particle diameter of 30 nm or less and the shell unit may have a thickness of greater than 0 nm and less than or equal to 5 nm, and more specifically, the hollow metal nanoparticles may have an average particle diameter of 20 nm or less or 10 nm or less, and the shell unit may have a thickness of greater than 0 nm and less than or equal to 3 nm.

According to one embodiment of the present specification, the hollow metal nanoparticles may have a cavity particle diameter of greater than or equal to 1 nm and less than or equal to 10 nm, and specifically greater than or equal to 1 nm and less than or equal to 4 nm. In addition, each of the shells may have a thickness of greater than or equal to 0.25 nm and less than or equal to 5 nm and specifically greater than or equal to 0.25 nm and less than or equal to 3 nm. The shell unit may be a shell formed by mixing a first metal and a second metal, and may be a plurality of shells including a first shell and a second shell separately formed each with a different mixing ratio of a first metal and a second metal. Alternatively, the shell unit may be a plurality of shells including a first shell including only a first metal and a second shell including only a second metal.

According to one embodiment of the present specification, particle diameters of the many hollow metal nanoparticles may be within a 80% to 120% range of the average particle diameter of the hollow metal nanoparticles. Specifically, particle diameters of the hollow metal nanoparticles may be within a 90% to 110% range of an average particle diameter of the hollow metal nanoparticles. When the particle diameters are outside the above-mentioned range, sizes of the hollow metal nanoparticles become non-uniform in general, and it may be difficult to secure specific physical property values required for the hollow metal nanoparticles. For example, when using hollow metal nanoparticles having particle diameters outside the 80% to 120% range of the average particle diameter as a catalyst, catalyst activity may become rather insufficient.

According to one embodiment of the present specification, the electrode catalyst may include a carrier-hollow metal nanoparticle complex in which the hollow metal nanoparticles are supported on a carrier.

One embodiment of the present specification provides a catalyst for a fuel cell including hollow metal nanoparticles that include a hollow core unit; and a shell unit including a first metal and a second metal, wherein at least two major peaks representing atomic percentage of at least any one of the first metal and the second metal are present in elemental analysis data of the particles.

In addition, one embodiment of the present specification provides a catalyst for a fuel cell including a component in which hollow metal nanoparticles including a hollow core unit; and a shell unit including a first metal and a second metal, wherein at least two major peaks representing atomic percentage of at least any one of the first metal and the second metal are present in elemental analysis data of the particles are supported on a carrier.

According to one embodiment of the present specification, the catalyst for a fuel cell may be the electrode catalyst described above.

According to one embodiment of the present specification, the hollow metal nanoparticles and the carrier may have a mass ratio of 1:9 to 4:6.

According to one embodiment of the present specification, the carrier may be a carbon-based material.

According to one embodiment of the present specification, the carbon-based material may be selected from the group consisting of carbon black, carbon nanotubes (CNT), graphite, graphene, activated carbon, mesoporous carbon, carbon fiber and carbon nanowires.

In the present specification, a cavity means a core part of hollow metal nanoparticles being empty. In addition, the cavity may have the same meaning with a hollow core. The cavity includes terms such as hollow, hole, void and porous.

According to one embodiment of the present specification, the cavity may include space in which internal materials are not present in 50% by volume or greater, specifically in 70% by volume or greater and more specifically in 80% by volume or greater. Alternatively, the cavity may include space in which 50% by volume or greater, specifically 70% by volume or greater and more specifically 80% by volume or greater of the inside is empty. Alternatively, the cavity may include space in which porosity inside is 50% by volume or greater, specifically 70% by volume or greater and more specifically 80% by volume or greater.

According to one embodiment of the present specification, the hollow core may have a volume of 50% by volume or greater, specifically 70% by volume or greater and more specifically 80% by volume or greater with respect to the total volume of the hollow metal nanoparticles. According to one embodiment of the present specification, the hollow core may have a volume of less than 100% by volume with respect to the total volume of the hollow metal nanoparticles. In addition, according to one embodiment of the present specification, the hollow core may have a volume of 90% by volume or less with respect to the total volume of the hollow metal nanoparticles.

According to one embodiment of the present specification, the shell unit of the hollow metal nanoparticles may be formed with metals including a first metal and a second metal. In other words, the shell unit of the hollow metal nanoparticles of the present specification may be formed with metals instead of metal oxides.

According to one embodiment of the present specification, the shell unit is present on the whole surface outside a cavity, and may be present in a form surrounding the cavity. Specifically, according to one embodiment of the present specification, the shell unit may be formed on a whole outer side surface of the cavity. In other words, the shell unit may form a shape of the hollow metal nanoparticles.

According to one embodiment of the present specification, the hollow metal nanoparticles may have a globular shape. In this case, the shape of the shell unit may be a globular shape including a hollow core.

The globular shape does not just mean a complete globular shape, and may include a shape that is roughly globular. For example, the hollow metal nanoparticles may have a globular shape of which outer surface is not flat, and in any one hollow metal nanoparticle, a radius of curvature may not be constant.

According to one embodiment of the present specification, the shell unit may be a shell of a single layer, or a shell of two or more layers.

According to one embodiment of the present specification, the shell unit may be formed by mixing the first metal and the second metal. Specifically, when the shell unit is a single layer, the first metal and the second metal may be present in a mixed form. Herein, the first metal and the second metal may be either uniformly or non-uniformly mixed.

According to one embodiment of the present specification, the shell unit may include a first shell formed with the first metal; and a second shell formed with the second metal.

Alternatively, according to one embodiment of the present specification, the shell unit may include a plurality of shells including a first shell including the first metal; and a second shell including the second metal.

According to one embodiment of the present specification, when the shell unit is a single layer, the first metal and the second metal may be present in a mixed form. Herein, the first metal and the second metal may be either uniformly or non-uniformly mixed.

According to one embodiment of the present specification, the first metal and the second metal of the shell unit may have an atomic percentage ratio of 1:5 to 10:1.

According to one embodiment of the present specification, when the shell unit is a single layer, a ratio of the first metal may be present in a gradation form in the shell. A ratio of the second metal may be constant in the shell, and a ratio of the first metal may be present in a gradation form.

As one example, based on the cross section of the shell, a ratio of the first metal is highest at the center, and a ratio of the first metal may decrease as closer to both ends of the shell. In other words, a ratio of the first metal may increase as moving from a part adjacent to a hollow core to the center of the shell, and a ratio of the first metal may decrease as moving from the center of the shell to an outer edge of the shell. Herein, a point having a highest ratio of the first metal may be present at the center of the shell.

As another example, in the shell, the first metal may be present in 50% by volume or greater or 70% by volume or greater in a part adjoining to a hollow core, and, in the shell, the second metal may be present in 50% by volume or greater or 70% by volume or greater in a surface part adjoining outside.

Alternatively, the shell may be a first shell or a second shell separately formed each with a different mixing ratio of a first metal and a second metal. Herein, in each shell, an atomic percentage ratio of the first metal:the second metal may be from 1:5 to 10:1.

According to one embodiment of the present specification, when the shell unit is two or more layers, each shell may include only a first metal or a second metal. For example, the hollow metal nanoparticles may include a hollow core; one, two or more first shells including a first metal; and one, two or more second shells including a second metal.

According to one embodiment of the present specification, the first shell may be present on the whole surface outside a cavity.

The second shell may be present in at least one region of an outer side surface of the first shell, and may be present in a form surrounding the whole surface of an outer side surface of the first shell. When the second shell is present in some regions of an outer side surface of the first shell, the second shell may be present in a discontinuous surface form.

According to one embodiment of the present specification, the hollow metal nanoparticles may include a hollow core, a first shell including a first metal formed on the whole outer side surface of the hollow core, and a second shell including a second metal formed on the whole outer side surface of the first shell. Alternatively, according to one embodiment of the present specification, the hollow metal nanoparticles may include a single layer shell including a first metal and a second metal formed on the whole outer side surface of the hollow core. In this case, the hollow core may include a surfactant having a positive charge.

According to one embodiment of the present specification, the first metal and the second metal are different from each other, and may be each selected from the group consisting of metals belonging to Groups 3 to 15 on the periodic table, metalloids, lanthanum-group metals and actinium-group metals.

Specifically, according to one embodiment of the present specification, the first metal and the second metal are different from each other, and may be each selected from the group consisting of platinum (Pt), ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), gold (Au), cerium (Ce), silver (Ag) and copper (Cu).

According to one embodiment of the present specification, any one of the first metal and the second metal is platinum (Pt), and the remaining any one may be nickel (Ni), cobalt (Co), iron (Fe), copper (Cu) or palladium (Pd). Specifically, according to one embodiment of the present specification, any one of the first metal and the second metal is platinum (Pt), and the remaining one may be nickel (Ni).

According to one embodiment of the present specification, at least two major peaks representing at least any one atomic percentage of the first metal and the second metal may be present in elemental analysis data of the hollow metal nanoparticles.

In a graph representing atomic percentage included in the particles in elemental analysis data of the particles, peaks mean points having a sharp shape as the slope of the graph changes from a positive value to a negative value.

According to one embodiment of the present specification, a major peak means a peak locating at each top of mountaintops of connection lines connecting peaks among peaks representing atomic percentage included in particles in elemental analysis data of the particles. Herein, the peak locating at the top of each peak mountaintop may be one, but may be two or more having the same atomic percentage value.

According to one embodiment of the present specification, a major peak means a peak locating at each top of mountaintops having a height higher than an average value of peaks among mountaintops of connection lines connecting peaks among peaks representing atomic percentage included in particles in elemental analysis data of the particles. Herein, an average value of peaks means an average value of all peaks representing atomic percentage.

According to one embodiment of the present specification, a major peak means a peak locating at the top of mountaintops having a first or second highest height among mountaintops of connection lines connecting peaks among peaks representing atomic percentage included in particles in elemental analysis data of the particles.

According to one embodiment of the present specification, when a particle diameter of the hollow metal nanoparticles is employed as 100%, at least one major peak representing atomic percentage of the first metal may be present in a 0% to 30% region from one end point of the particle diameter, and at least one another major peak representing atomic percentage of the first metal may be present in a 0% to 30% region from the other end point of the particle diameter.

According to one embodiment of the present specification, when a particle diameter of the hollow metal nanoparticles is employed as 100%, at least one major peak representing atomic percentage of the second metal may be present in a 0% to 30% region from one end point of the particle diameter, and at least one another major peak representing atomic percentage of the second metal may be present in a 0% to 30% region from the other end point of the particle diameter.

Herein, a particle diameter of the hollow metal nanoparticles means from a starting point or one end point to the other end point of a graph connecting peaks of the first metal, and the starting point or the end point means a point at which a graph connecting peaks of the first metal begins; or a point at which a vertical value of a graph connecting peaks of the first metal becomes 0.

According to one embodiment of the present specification, at least two major peaks representing atomic percentage of the second metal may be present. Herein, when a particle diameter of the hollow metal nanoparticles is employed as 100%, at least one major peak representing atomic percentage of the second metal may be present in a 0% to 30% region from one end point of the particle diameter, and at least one another major peak representing atomic percentage of the second metal may be present in a 0% to 30% region from the other end point of the particle diameter.

Then, a particle diameter of the hollow metal nanoparticles means from a starting point or one end point to the other end point of a graph connecting peaks of the second metal, and the starting point or the end point means a point at which a graph connecting peaks of the second metal begins; or a point at which a vertical value of a graph connecting peaks of the second metal becomes 0.

According to one embodiment of the present specification, peaks representing atomic percentage of the first metal or the second metal may be present in plural numbers in the whole region of the particle diameter.

One embodiment of the present specification may provide hollow metal nanoparticles including a hollow core unit; and a shell unit including a first metal and a second metal, wherein at least two major peaks representing atomic percentage of the first metal in elemental analysis data of the particles are present, and peaks representing atomic percentage of the second metal are present in plural numbers in the whole region of the particle diameter.

One embodiment of the present specification may provide hollow metal nanoparticles including a hollow core unit; and a shell unit including a first metal and a second metal, wherein at least two major peaks representing atomic percentage of the second metal in elemental analysis data of the particles are present, and peaks representing atomic percentage of the first metal are present in plural numbers in the whole region of the particle diameter.

One embodiment of the present specification may provide hollow metal nanoparticles including a hollow core unit; and a shell unit including a first metal and a second metal, wherein at least two major peaks representing atomic percentage of the first metal in elemental analysis data of the particles are present, and at least two major peaks representing atomic percentage of the second metal are present.

The cross-sectional elemental analysis data of the particles may be obtained using an energy dispersive spectrometer (EDS). Specifically, the cross-sectional elemental analysis data identifies which element is measured in a two-dimensional region when looking through particles from the above. In other words, in the hollow metal nanoparticles, elements are distributed relatively more densely in the shell unit than the region having a cavity, and therefore, may be observed in a major peak form. Furthermore, when the amounts of the elements are relatively very small, a plurality of peaks may be observed in the whole region.

According to one embodiment of the present specification, the hollow nanoparticles may include an anionic surfactant or a cationic surfactant inside the hollow core.

According to one embodiment of the present specification, the electrode catalyst may be included in a cathode.

Specifically, according to one embodiment of the present specification, the electrode catalyst may be an electrode catalyst for a cathode.

One embodiment of the present specification provides a method for manufacturing a fuel cell including preparing an electrode catalyst including hollow metal nanoparticles that include a hollow core unit; and a shell unit including a first metal and a second metal; preparing an electrolyte membrane; forming a cathode on one surface of the electrolyte membrane; and forming an anode on the other side of the electrolyte membrane, wherein the hollow metal nanoparticles have an average particle diameter of 30 nm or less, and at least one of the forming of a cathode and the forming of an anode uses the electrode catalyst.

One embodiment of the present specification provides a method for manufacturing a fuel cell including preparing an electrode catalyst including hollow metal nanoparticles that include a hollow core unit; and a shell unit including a first metal and a second metal, wherein at least two major peaks representing at least any one atomic percentage of the first metal and the second metal are present in elemental analysis data of the particles; preparing an electrolyte membrane; forming a cathode on one surface of the electrolyte membrane; and forming an anode on the other side of the electrolyte membrane, wherein at least one of the forming of a cathode and the forming of an anode uses the electrode catalyst.

According to one embodiment of the present specification, the preparing of an electrode catalyst includes forming a solution by adding a first metal salt, a second metal salt and a surfactant to a solvent; and forming hollow metal nanoparticles by adding a reducing agent to the solution, wherein the forming of a solution includes the surfactant forming a micelle, and the first metal salt and the second metal salt surrounding outside the micelle, and the forming of hollow metal nanoparticles includes the micelle region being formed to a cavity.

According to one embodiment of the present specification, the preparing of an electrode catalyst includes forming a solution by adding a first metal salt, a second metal salt and a surfactant to a solvent; forming hollow metal nanoparticles by adding a reducing agent to the solution; and forming a carrier-hollow metal nanoparticle complex by supporting the hollow metal nanoparticles on a carrier, wherein the forming of a solution includes the surfactant forming a micelle, and the first metal salt and the second metal salt surrounding outside the micelle, and the forming of hollow metal nanoparticles includes the micelle region being formed to a cavity.

According to one embodiment of the present specification, the preparing of an electrode catalyst includes forming a solution by adding a first metal salt, a second metal salt and a surfactant to a solvent; adding a carrier to the solution for dispersion; and forming a carrier-hollow metal nanoparticle complex in which the hollow metal nanoparticles are supported on the carrier by adding a reducing agent to the solution, wherein the forming of a solution includes the surfactant forming a micelle, and the first metal salt and the second metal salt surrounding outside the micelle, and the hollow metal nanoparticles may include the micelle region being formed to a cavity.

One embodiment of the present specification provides a method for preparing the catalyst for a fuel cell including forming a solution by adding a first metal salt, a second metal salt and a surfactant to a solvent; and forming hollow metal nanoparticles by adding a reducing agent to the solution, wherein the forming of a solution includes the surfactant forming a micelle, and the first metal salt and the second metal salt surrounding outside the micelle, and the forming of hollow metal nanoparticles includes the micelle region being formed to a cavity.

In addition, one embodiment of the present specification provides a method for preparing the catalyst for a fuel cell including forming a solution by adding a first metal salt, a second metal salt and a surfactant to a solvent; forming hollow metal nanoparticles by adding a reducing agent to the solution; and supporting the hollow metal nanoparticles on a carrier, wherein the forming of a solution includes the surfactant forming a micelle, and the first metal salt and the second metal salt surrounding outside the micelle, and the forming of hollow metal nanoparticles includes the micelle region being formed to a cavity.

According to one embodiment of the present specification, the supporting of the hollow metal nanoparticles on a carrier may be adding a carrier after the forming of hollow metal nanoparticles.

In addition, one embodiment of the present specification provides a method for preparing the catalyst for a fuel cell including forming a solution by adding a first metal salt, a second metal salt and a surfactant to a solvent; adding a carrier to the solution for dispersion; and forming a carrier-hollow metal nanoparticle complex in which the hollow metal nanoparticles are supported on the carrier by adding a reducing agent to the solution, wherein the forming of a solution includes the surfactant forming a micelle, and the first metal salt and the second metal salt surrounding outside the micelle, and the hollow metal nanoparticles include the micelle region being formed to a cavity.

Specifically, according to one embodiment of the present specification, the forming of a carrier-hollow metal nanoparticle complex may be adding a carrier to the solution prior to adding a reducing agent. In other words, according to a method for preparing the catalyst for a fuel cell according to one embodiment of the present specification, the hollow metal nanoparticles may be prepared on a carrier. In this case, the carrier is added in the middle of the preparation, and there is an advantage in that stability of the hollow metal nanoparticles becomes excellent since adhesive strength between the carrier and the prepared hollow metal nanoparticles becomes favorable.

The preparing of an electrode catalyst according to one embodiment of the present specification also has an advantage in that the degree of dispersion of the hollow metal nanoparticles becomes excellent on the carrier. As the degree of dispersion is enhanced, active sites capable of participating in a reaction increases, and an effect of better reactivity is obtained. In addition, an advantage of enhanced durability is obtained since interaction between the hollow metal nanoparticles and the carrier becomes favorable.

According to one embodiment of the present specification, the hollow metal nanoparticles may be prepared using the following preparation method.

Forming of hollow metal nanoparticles according to one embodiment of the present specification includes forming a solution by adding a first metal salt, a second metal salt and a surfactant to a solvent; and forming hollow metal nanoparticles by adding a reducing agent to the solution, wherein the forming of a solution includes the surfactant forming a micelle, and the first metal salt and the second metal salt surrounding outside the micelle, and the forming of hollow metal nanoparticles includes the micelle region being formed to a cavity.

Forming of hollow metal nanoparticles according to one embodiment of the present specification does not use a reduction potential difference, and there is an advantage in that reduction potential between a first metal and a second metal is not considered. The method is simpler than existing preparation methods since charges between metal ions are used, and there is an advantage in that mass production is readily achieved.

According to one embodiment of the present specification, the first metal salt is not particularly limited as long as it is capable of providing metal ions of the first metal by being ionized in a solution. The first metal salt may include the first metal. Herein, the first metal may be different from the second metal.

According to one embodiment of the present specification, the second metal salt is not particularly limited as long as it is capable of providing metal ions of the second metal by being ionized in a solution. The second metal salt may include the second metal. Herein, the second metal may be different from the first metal.

According to one embodiment of the present specification, the first metal salt and the second metal salt may each be nitrates ($NO^{3-}$), halides such as chlorides ($Cl^-$), bromides ($Br^-$) and iodides ($I^-$), hydroxides ($OH^-$) or sulfates ($SO^{4-}$) of the first metal and the second metal, but are not limited thereto.

According to one embodiment of the present specification, the first metal salt may have a form surrounding an outer surface of a surfactant forming a micelle. In addition, the second metal salt may have a form surrounding the first metal salt. The first metal salt and the second metal salt may form a shell unit including the first metal and the second metal, respectively, by a reducing agent.

According to one embodiment of the present specification, the first metal salt and the second metal salt may have a molar ratio of 1:1 to 10:1 and specifically 2:1 to 5:1. When the molar number of the first metal salt is smaller than the molar number of the second metal salt, the first metal is difficult to form a first shell including a cavity. In addition, when the molar number of the first metal salt is larger than the molar number of the second metal salt by 10 times or greater, the second metal salt is difficult to form a second shell surrounding the first shell.

According to one embodiment of the present specification, the solvent may be a solvent including water. Specifically, according to one embodiment of the present invention, the solvent dissolves a first metal salt and a second metal salt, and may be water or a mixture of water and a C1 to C6 alcohol, and specifically water.

The preparing of an electrode catalyst in the present specification may not use an organic solvent as the solvent, and a post treatment process treating the organic solvent is not required in a manufacturing process, and accordingly, effects of cost savings and environmental pollution prevention are obtained.

According to one embodiment of the present specification, the surfactant may form a micelle in the solution. The charge of the surfactant may be divided depending on the charge types of an outer side surface of the micelle. In other words, when the charge of an outer side surface of the micelle is anionic, the surfactant forming the micelle may be an anionic surfactant. In addition, when the charge of an outer side surface of the micelle is cationic, the surfactant forming the micelle may be a cationic surfactant.

According to one embodiment of the present specification, the surfactant may be an anionic surfactant. Specifically, the surfactant may be selected from the group consisting of potassium laurate, triethanolamine stearate, ammonium lauryl sulfate, lithium dodecyl sulfate, sodium lauryl sulfate, sodium dodecyl sulfate, alkyl polyoxyethylene sulfate, sodium alginate, dioctyl sodium sulfosuccinate, phosphatidyl glycerol, phosphatidyl inositol, phosphatidylserine, phosphatidic acid and salts thereof, glyceryl ester, sodium carboxymethylcellulose, bile acid and salts thereof, colic acid, deoxycolic acid, glycocolic acid, taurocolic acid, glycodeoxycolic acid, alkyl sulfonate, aryl sulfonate, alkyl phosphate, alkyl phosphonate, stearic acid and salts thereof, calcium stearate, phosphate, carboxymethylcellulose sodium, dioctyl sulfosuccinate, dialkylester of sodium sulfosuccinate, phosphatide and calcium carboxymethylcellulose.

When the surfactant is an anionic surfactant, an outer side surface of the surfactant forming a micelle has an anionic property, and therefore, may be surrounded by a first metal salt having a cationic property. Furthermore, the first metal salt may be surrounded by a second metal salt having an anionic property.

According to one embodiment of the present specification, in a region where the anionic surfactant forms a micelle, the first metal salt having a cationic property and the second metal salt having an anionic property are not present, and as a result, a cavity may be formed. In other words, when the first metal salt and the second metal salt are formed to a shell unit including the first metal and the second metal by a reducing agent, the region forming a micelle may be a hollow core that does not include metals.

According to one embodiment of the present specification, the surfactant may be a cationic surfactant. Specifically, the surfactant may be selected from the group consisting of quaternary ammonium compounds, benzalkonium chloride, cetyltrimethyl ammonium bromide, chitosan, lauryldimethylbenzyl ammonium chloride, acyl carnitine hydrochloride, alkylpyridinium halides, cetylpyridinium chloride, cationic lipid, polymethyl methacrylate trimethyl ammonium bromide, sulfonium compounds, polyvinylpyrrolidone-2-dimethylaminoethyl methacrylate dimethyl sulfate, hexadecyltrimethyl ammonium bromide, phosphonium compounds, benzyl-di(2-chloroethyl)ethyl ammonium bromide, coconut trimethyl ammonium chloride, coconut trimethyl ammonium bromide, coconut methyl dihydroxyethyl ammonium chloride, coconut methyl dihydroxyethyl ammonium bromide, decyl triethyl ammonium chloride, decyl dimethyl hydroxyethyl ammonium chloride bromide, C12-15-dimethyl hydroxyethyl ammonium chloride, C12-15-dimethyl hydroxyethyl ammonium chloride bromide, coconut dimethyl hydroxyethyl ammonium chloride, coconut dimethyl hydroxyethyl ammonium bromide, myristyl trimethyl ammonium methylsulfate, lauryl dimethyl benzyl ammonium chloride, lauryl dimethyl benzyl ammonium bromide, lauryl dimethyl (ethenoxy)4 ammonium chloride, lauryl dimethyl (ethenoxy)4 ammonium bromide, N-alkyl (C12-18)dimethylbenzyl ammonium chloride, N-alkyl (C14-18) dimethyl-benzyl ammonium chloride, N-tetradecyldimethylbenzyl ammonium chloride monohydrate, dimethyl didecyl ammonium chloride, N-alkyl (C12-14)dimethyl 1-naphthylmethyl ammonium chloride, trimethyl ammonium halide alkyl-trimethyl ammonium salts, dialkyl-dimethyl ammonium salts, lauryl trimethyl ammonium chloride, ethoxylated alkylamidoalkyldialkyl ammonium salts, ethoxylated trialkyl ammonium salts, dialkylbenzene dialkyl ammonium chloride, N-didecyldimethyl ammonium chloride, N-tetradecyldimethylbenzyl ammonium chloride monohydrate, N-alkyl(C12-14) dimethyl 1-naphthylmethyl ammonium chloride, dodecyldimethylbenzyl ammonium chloride, dialkyl benzenealkyl ammonium chloride, lauryl trimethyl ammonium chloride, alkylbenzyl methyl ammonium chloride, alkyl benzyl dimethyl ammonium bromide, C12 trimethyl ammonium bromide, C15 trimethyl ammonium bromide, C17 trimethyl ammonium bromide, dodecyl benzyl triethyl ammonium chloride, polydiallyl dimethyl ammonium chloride, dimethyl ammonium chloride, alkyldimethyl ammonium halogenides, tricetyl methyl ammonium chloride, decyl trimethyl ammonium bromide, dodecyl triethyl ammonium bromide, tetradecyl trimethyl ammonium bromide, methyl trioctyl ammonium chloride, POLYQUAT 10, tetrabutyl ammonium bromide, benzyl trimethyl ammonium bromide, coline ester, benzalkonium chloride, stearalkonium chloride, cetylpyridinium bromide, cetylpyridinium chloride, halide salts of quaternized polyoxyethylalkylamine, "MIRAPOL" (polyquaternium-2), "Alkaquat" (prepared by alkyl dimethyl benzyl ammonium chloride and Rhodia), alkyl pyridinium salts, amine, amine salts, imide azolinium salts, protonated quaternary acrylamide, methylated quaternary polymers, cationic guar gum, benzalkonium chloride, dodecyl trimethyl ammonium bromide, triethanolamine and poloxamine.

When the surfactant is a cationic surfactant, an outer side surface of the surfactant forming a micelle has a cationic property, and therefore, may be surrounded by a first metal salt having an anionic property. Furthermore, the first metal salt may be surrounded by a second metal salt having a cationic property.

According to one embodiment of the present specification, in a region where the cationic surfactant forms a micelle, the first metal salt having an anionic property and the second metal salt having a cationic property are not present, and as a result, a cavity may be formed. In other words, when the first metal salt and the second metal salt are formed to a shell unit including the first metal and the second metal by a reducing agent, the region forming a micelle may be a hollow core that does not include metals.

According to one embodiment of the present specification, a concentration of the surfactant may be greater than or equal to 1 time and less than or equal to 5 times of a critical micelle concentration (CMC) for the solvent. Specifically, according to one embodiment of the present specification, a concentration of the surfactant in the solution may be greater than or equal to 1 time and less than or equal to 5 times of a critical micelle concentration (CMC) for water when selecting water as the solvent.

When a concentration of the surfactant is less than a critical micelle concentration, a concentration of the surfactant adsorbed to the first metal salt may be relatively low. Accordingly, an amount of the surfactant forming a formed core may also decrease in general. Meanwhile, when a concentration of the surfactant is greater than 5 times of a critical micelle concentration, a concentration of the surfactant is relatively high, and the surfactant forming a hollow core and metal particles that do not form a hollow core may be mixed and aggregated.

According to one embodiment of the present specification, sizes of the hollow metal nanoparticles may be controlled by controlling the surfactant forming a micelle and/or the first and the second metal salts surrounding the micelle.

According to one embodiment of the present specification, sizes of the hollow metal nanoparticles may be controlled by a chain length of the surfactant forming a micelle. Specifically, a micelle size decreases when the surfactant has a short chain length, and a cavity size also decreases, and accordingly, sizes of the hollow metal nanoparticles may decrease.

According to one embodiment of the present specification, the number of carbon atoms in the chain of the surfactant may be 15 or less. Specifically, the number of carbon atoms in the chain may be greater than or equal to 8 and less than or equal to 15. Alternatively, the number of carbon atoms in the chain may be greater than or equal to 10 and less than or equal to 12.

According to one embodiment of the present specification, sizes of the hollow metal nanoparticles may be controlled by controlling types of a counter ion of the surfactant forming a micelle. Specifically, as a size of a counter ion of the surfactant increases, binding strength of a head part of an outer side end of the surfactant becomes weak, and a cavity size may increase, and accordingly, sizes of the hollow metal nanoparticles may increase.

According to one embodiment of the present specification, when the surfactant is an anionic surfactant, the surfactant may include $NH_4^+$, $K^+$, $Na^+$ or $Li^+$ as a counter ion.

Specifically, sizes of the hollow nanoparticles may decrease in order of a counter ion of the surfactant being $NH_4^+$, a counter ion of the surfactant being $K^+$, a counter ion of the surfactant being $Na^+$, and a counter ion of the surfactant being $Li^+$. This is identified from examples to be described below.

According to one embodiment of the present specification, when the surfactant is a cationic surfactant, the surfactant may include $I^-$, $Br^-$ or $Cl^-$ as a counter ion.

Specifically, sizes of the hollow nanoparticles may decrease in order of a counter ion of the surfactant being $I^-$, a counter ion of the surfactant being $Br^-$, and a counter ion of the surfactant being $Cl^-$.

According to one embodiment of the present specification, sizes of the hollow metal nanoparticles may be controlled by controlling a size of a head part of an outer side end of the surfactant forming a micelle. Furthermore, when increasing a head part size of the surfactant formed on an outer surface of a micelle, repulsive force between head parts of the surfactant becomes large leading to an increase in a cavity size, and accordingly, sizes of the hollow metal nanoparticles may increase.

According to one embodiment of the present specification, sizes of the hollow metal nanoparticles may be determined from a complex function of the above-described components.

According to one embodiment of the present specification, the preparing of an electrode catalyst may be carried out at room temperature. Specifically, the preparing of an electrode catalyst may be carried out at a temperature in a range higher than or equal to 4° C. and lower than or equal to 35° C. and more specifically higher than or equal to 15° C. and lower than or equal to 28° C.

According to one embodiment of the present specification, the forming of a solution may be carried out at room temperature, specifically at a temperature in a range higher than or equal to 4° C. and lower than or equal to 35° C. and more specifically higher than or equal to 15° C. and lower than or equal to 28° C. When using an organic solvent as the solvent, there is a problem in that the preparation needs to be carried out at a high temperature of higher than 100° C.

According to one embodiment of the present specification, the forming of a solution may be carried out for 5 minutes to 120 minutes, more specifically for 10 minutes to 90 minutes and even more specifically for 20 minutes to 60 minutes.

According to one embodiment of the present specification, the forming of hollow metal nanoparticles by adding a reducing agent to the solution may also be carried out at room temperature, specifically at a temperature in a range higher than or equal to 4° C. and lower than or equal to 35°

C. and more specifically higher than or equal to 15° C. and lower than or equal to 28° C.

The forming of hollow metal nanoparticles may be carried out by reacting the solution and a reducing agent for a certain period of time, specifically for 5 minutes to 120 minutes, more specifically for 10 minutes to 90 minutes and even more specifically for 20 minutes to 60 minutes.

The preparing of an electrode catalyst according to the present specification may be carried out at room temperature, and therefore, has an advantage in terms of a process due to a simple preparation method, and has a high cost-saving effect.

According to one embodiment of the present specification, the reducing agent is not particularly limited as long as it is a strong reducing agent having standard reduction of −0.23 V or less and specifically greater than or equal to −4 V and less than or equal to −0.23 V, and has reducing power capable of reducing dissolved metal ions and precipitating the metal ions as metal particles.

Examples of such a reducing agent may include at least any one selected from the group consisting of $NaBH_4$, $NH_2NH_2$, $LiAlH_4$ and $LiBEt_3H$.

When using a weak reducing agent, the reaction rate is low, and a continuous process is difficult to be carried out since follow-up heating of a solution is required and the like, which are problematic for mass production. Particularly, when using ethylene glycol, one type of a weak reducing agent, a flow rate decreases due to high viscosity leading to a problem of low productivity in a continuous process.

According to one embodiment of the present specification, the forming of hollow metal nanoparticles may be further adding a nonionic surfactant. According to one embodiment of the present specification, the nonionic surfactant may be specifically selected from the group consisting of polyoxyethylene fatty alcohol ether, polyoxyethylene sorbitan fatty acid ester, polyoxyethylene fatty acid ester, polyoxyethylene alkyl ether, polyoxyethylene castor oil derivatives, sorbitan ester, glyceryl ester, glycerol monostearate, polyethylene glycol, polypropylene glycol, polypropylene glycol ester, cetyl alcohol, cetostearyl alcohol, stearyl alcohol, arylalkyl polyether alcohol, polyoxyethylene polyoxypropylene copolymers, poloxamer, polaxamine, methylcellulose, hydroxycellulose, hydroxymethyl cellulose, hydroxyethyl cellulose, hydroxypropyl cellulose, hydroxypropyl methylcellulose, hydroxypropyl methylcellulose phthalate, noncrystalline cellulose, polysaccharides, starch, starch derivatives, hydroxyethyl starch, polyvinyl alcohol, triethanolamine stearate, amine oxide, dextran, glycerol, acacia gum, cholesterol, tragacanth and polyvinylpyrrolidone.

The nonionic surfactant is adsorbed to a surface of the shell and performs a role of uniformly dispersing the hollow metal nanoparticles formed in a solution. Therefore, the nonionic surfactant prevents the hollow metal particles from being precipitated from aggregation, and allows the hollow metal nanoparticles to be formed in a uniform size.

According to one embodiment of the present specification, the forming of hollow metal nanoparticles may be further adding a stabilizing agent.

According to one embodiment of the present specification, the stabilizing agent may specifically include one, two or more selected from the group consisting of disodium phosphate, dipotassium phosphate, disodium citrate and trisodium citrate.

According to one embodiment of the present specification, the preparation method may further include removing the surfactant inside a cavity after the forming of hollow metal nanoparticles. The removing method is not particularly limited, and for example, may use a method of washing with water. The surfactant may be an anionic surfactant or a cationic surfactant.

The method for preparing hollow metal nanoparticles according to one embodiment of the present specification may further include removing a first shell including a first metal by adding an acid to the hollow metal nanoparticles after the forming of hollow metal nanoparticles.

According to one embodiment of the present specification, the acid is not particularly limited, and for example, those selected from the group consisting of sulfuric acid, nitric acid, hydrochloric acid, perchloric acid, hydriodic acid and hydrobromic acid may be used.

According to one embodiment of the present specification, after forming the hollow metal nanoparticles, the solution including the hollow metal nanoparticles may be centrifuged for precipitating the hollow metal nanoparticles included in the solution. After the centrifugation, only the separated hollow metal nanoparticles may be collected. As necessary, a baking process of the hollow metal nanoparticles may be additionally carried out.

According to one embodiment of the present specification, hollow metal nanoparticles having a uniform size may be prepared. Hollow metal nanoparticles having a few nanometer size are difficult to prepare using existing methods, and hollow metal nanoparticles having a uniform size are more difficult to prepare.

One embodiment of the present specification provides a membrane electrode assembly including a cathode; an anode disposed opposite to the cathode; and an electrolyte membrane disposed between the cathode and the anode, wherein at least one of the cathode and the anode includes a catalyst layer including the catalyst for a fuel cell.

According to one embodiment of the present specification, the catalyst layer may be included in the cathode. Specifically, according to one embodiment of the present specification, the catalyst for a fuel cell may be a fuel cell cathode catalyst.

In addition, one embodiment of the present specification provides a fuel cell including the membrane electrode assembly.

According to one embodiment of the present specification, the fuel cell may be a polyelectrolyte fuel cell (PEMFC), a phosphoric acid fuel cell (PAFC) or a direct methanol fuel cell (DMFC).

FIG. 1 is an exploded perspective view representing one embodiment of the fuel cell. In addition, FIG. 2 is a cross-sectional schematic diagram of a membrane electrode assembly (MEA) forming the fuel cell of FIG. 1.

The fuel cell (1) shown in FIG. 1 is schematically formed with two unit cells (11) canalized in a pair of holders (12, 12). The unit cell (11) is formed with a membrane electrode assembly (10), and bipolar plates (20, 20) disposed on both sides in a thickness direction of the membrane electrode assembly (10). The bipolar plates (20, 20) are formed with metals, carbon or the like having conductivity, and by being connected to the membrane electrode assembly (10), each of the bipolar plates supplies oxygen and fuel for a catalyst layer of the membrane electrode assembly (10) while functioning as a collector.

In addition, the fuel cell (1) shown in FIG. 1 has two unit cells (11), however, the number of unit cells are not limited to two, and may increase to tens to hundreds depending on the properties required for fuel cells.

As shown in FIG. 2, the membrane electrode assembly (10) is formed with an electrolyte membrane (100), catalyst layers (110, 110') disposed on both sides in a thickness direction of the electrolyte membrane (100), and gas diffusion layers (120, 120') each laminated on the catalyst layers (110, 110') and including micropore layers (121, 121') and supports (122, 122').

The gas diffusion layers (120, 120') preferably have porosity so as to diffuse oxygen and fuel supplied through the bipolar plates (20, 20) to the whole surface of the catalyst layers (110, 110'), to quickly discharge water formed in the catalyst layers (110, 110'), and to make air flow smooth. In addition, the gas diffusion layers need to have electrical conductivity so as to transfer current generated in the catalyst layers (110, 110').

The gas diffusion layers (120, 120') are formed with the micropore layers (121, 121') and the supports (122, 122'). The supports (122, 122') may be an electrical material such as metals or carbon-based materials. For example, conductive substrates such as carbon paper, carbon cloth, carbon felt or metal cloth may be used, however, the support is not limited thereto.

The micropore layers (121, 121') may generally include conductive powder having a small particle diameter, for example, carbon powder, carbon black, acetylene black, active carbon, carbon fiber, fullrene, carbon nanotubes, carbon nanowires, carbon nanohorns or carbon nano-rings. Conductive powder forming the micropore layers (121, 121') may have insufficient gas diffusion due to a severe pressure increase when having a too small particle size, and when the particle size becomes too big, uniform gas diffusion may be difficult. Accordingly, conductive powder having an average particle diameter in a 10 nm to 50 nm range may be generally used considering a gas diffusion effect.

The gas diffusion layers (120, 120') may use commercialized products, or may be prepared by purchasing carbon paper only, and personally coating the micropore layers (121, 121') thereon. The micropore layer (120, 120') has gas diffusion through pores formed between the conductive powder, and an average pore size of these pores is not particularly limited. For example, an average pore size of the micropore layer (120, 120') may be in a 1 nm to 10 μm range. For example, an average pore size of the micropore layer (120, 120') may be in a 5 nm to 1 μm range, a 10 nm to 500 nm range, or a 50 nm to 400 nm range.

Thicknesses of the gas diffusion layers (120, 120') may be in a 200 μm to 400 μm range considering a gas diffusion effect, electrical resistance and the like. For example, thicknesses of the gas diffusion layers (120, 120') may be from 100 μm to 350 μm and more specifically from 200 μm to 350 μm.

The catalyst layers (110, 110') function as a fuel electrode and an oxygen electrode, and may be each formed including the electrode catalyst for a fuel cell described above and a binder, and materials capable of increasing an electrochemical surface area of the electrode catalyst may be further included.

The catalyst layers (110, 110') may have thicknesses of 10 μm to 100 μm so as to effectively activate an electrode reaction and prevent an excessive increase of electrical resistance. For example, the catalyst layer (110, 110') may have a thickness of 20 μm to 60 μm and more specifically 30 μm to 50 μm.

The catalyst layers (110, 110') may further include a binder resin for enhancing adhesive strength of the catalyst layers and transferring hydrogen ions. Using a polymer resin having hydrogen ion conductivity is preferable as the binder resin, and more preferably, a polymer resin having a cation exchanger selected from the group consisting of a sulfonic acid group, a carboxylic acid group, a phosphoric acid group, a phosphonic acid group and derivatives thereof on a side chain may be used. Preferably, one or more types of hydrogen ion conducting polymers selected from among fluoro-based polymers, benzimidazole-based polymers, polyimide-based polymers, polyetherimide-based polymers, polyphenylene sulfide-based polymers, polysulfone-based polymers, polyethersulfone-based polymers, polyether ketone-based polymers, polyether-ether ketone-based polymers, or polyphenyl quinoxaline-based polymers.

The catalyst layers (110, 110'), the micropore layers (121, 121') and the supports (122, 122') may be disposed to be adjacent to each other, and layers having other functions may be additionally inserted between the above-mentioned layers as necessary. These layers form a cathode and an anode of the membrane electrode assembly.

The electrolyte membrane (100) is disposed adjacent to the catalyst layers (110, 110'). The electrolyte membrane is not particularly limited, and examples thereof may include one or more polymer electrolyte membranes selected from the group consisting of polybenzimidazole (PBI), cross-linked polybenzimidazole, poly(2,5-benzimidazole) (AB-PBI), polyurethane, and modified polytetrafluoroethylene (modified PTFE).

Phosphoric acid or organic phosphoric acid is impregnated in the electrolyte membrane (100), and acids other than phosphoric acid may also be used. For example, phosphoric acid-based materials such as polyphosphoric acid, phosphonic acid ($H_3PO_3$), orthophosphoric acid ($H_3PO_4$), pyrophosphoric acid ($H_4P_2O_7$), triphosphoric acid ($H_5P_3O_{10}$), metaphosphoric acid or derivatives thereof may be impregnated in the electrolyte membrane (100). A concentration of these phosphoric acid-based materials is not particularly limited, but may be at least 80% by weight, 90% by weight, 95% by weight or 98% by weight, and for example, 80% by weight to 100% by weight of an aqueous phosphoric acid solution may be used.

A fuel cell may be formed with a cathode that is an air electrode, an anode that is a hydrogen electrode, and a membrane electrode assembly (MEA), and an oxygen reduction reaction (ORR) occurring in a cathode that is an air electrode may be a rate determining step (RDS) of the whole fuel cell reaction.

According to one embodiment of the present specification, the electrode catalyst is included in the cathode, and may increase activity of an oxygen reduction reaction by weakening strong binding strength between the hollow metal nanoparticles and a reaction intermediate (OH) generated during the oxygen reduction.

When using the electrode catalyst according to one embodiment of the present specification as a cathode catalyst, a result of enhancing activity per mass by approximately 60% is obtained compared to commercial 20% Pt/C catalysts. In addition, an ORR more readily occurs in a cathode, and therefore, performance of a fuel cell may be enhanced. Furthermore, the electrode catalyst has an advantage of excellent durability. Specifically, excellent oxygen reduction activity may be maintained even after being operated for a long time of 1000 times or more.

In addition to the above-mentioned effects, the electrode catalyst according to one embodiment of the present specification may exhibit excellent effects even after lowering the content of expensive platinum, and therefore, is effective in lowering manufacturing costs of the fuel cell.

Hereinafter, the present specification will be described in detail with reference to examples. However, examples according to the present specification may be modified to various other forms, and the scope of the present specification is not interpreted to be limited to the examples described below. Examples in the present specification are provided in order to more completely describe the present specification for those having average knowledge in the art.

In order to measure activity and durability of an electrode catalyst included in a fuel cell according to one embodiment of the present specification, a half-electrode was prepared. Specifically, a 3 electrode half-cell was prepared using Ag/AgCl saturated KCl as a reference electrode, a Pt wire as a counter electrode, and a glassy carbon rotating disk electrode having a diameter of 5 mm as a working electrode, and furthermore, a catalyst ink was prepared using an electrode catalyst, and performance of a cathode was measured after coating the catalyst ink on the working electrode. Performance of the electrode catalyst measured using the half-electrode is the same as the performance in a unit battery. Accordingly, performance of a fuel cell according to the following examples is the same as the performance of an electrode catalyst in a unit battery.

Example 1

Preparation of Electrode Catalyst 0.1 mmol of $Ni(NO_3)_2$, 0.3 mmol of $K_2PtCl_4$, 1.5 mmol of trisodium citrate as a stabilizing agent, 3.2 mmol of lithium dodecyl sulfate (LiDS) as a surfactant were added to and dissolved in 260 ml of water to form a solution, and the result was stirred for 30 minutes. Herein, $Ni(NO_3)_2$ and $K_2PtCl_4$ had a molar ratio of 3:1, and a measured concentration of the LiDS was approximately twice a critical micelle concentration (CMC) for water.

Continuously, 1.1 mmol of $NaBH_4$, a reducing agent, was added to the solution, and the result was reacted for 2 hours. The synthesized PtNi hollow metal nanoparticle dispersion liquid was added dropwise to a carbon dispersion liquid. The result was stirred for 15 hours and washed 5 times with water to prepare an electrode catalyst.

The Pt content of the electrode catalyst prepared according to Example 1 was 24.4 wt %, and the Ni content was 1.6 wt %.

FIG. 3 and FIG. 4 are transmission electron microscopy (TEM) images of the electrode catalyst prepared according to Example 1.

Example 2

Measurement on Activity of Electrode Catalyst 2 mg of the electrode catalyst prepared in Example 1, 1.6 ml of ethanol, 0.4 ml of distilled water, and 20 μl of a 5 wt % nafion solution were mixed to prepare a catalyst ink. The catalyst ink was ultrasonicated for 2 hours and dispersed to prepare a catalyst dispersion liquid.

On a glassy carbon rotating disk electrode (RDE) having a diameter of 5 mm, which is a working electrode, 16 μl of the catalyst dispersion liquid was applied, and the result was dried to form a catalyst layer. In this case, the amount of the catalyst formed on the working electrode was 15 μg.

Furthermore, using a 0.1 M $HClO_4$ solution as an electrolyte liquid, an ORR activity test was carried out after cleaning the electrode surface by repeating cyclic voltammetry 15 times at a rate of 50 mV/s in a 0 V to 1.2 V range based on a normal hydrogen electrode (NHE). Herein, the used potentiostat was a Versa STAT MC model of Princeton Applied Research (PAR).

The ORR activity test was progressed at 1,600 rpm and 60° C. while supplying oxygen at a rate of 50 cc/min, and the last data after repeating 15 times at a rate of 20 mV/s in a 0.3 V to 1.2 V range based on a normal hydrogen electrode (NHE) were used.

Comparative Example 1

An ORR activity test was carried out under the same condition as in Example 2 except that 20% Pt/C (E-TEK) was used as the electrode catalyst.

The ORR measurement results according to Example 2 and Comparative Example 1 are shown in FIG. 5.

In FIG. 5, the x axis represents a voltage applied from a potentiostat, and the voltage moving higher at the same current density value means a favorable occurrence of an oxygen reduction reaction. In FIG. 5, when comparing the voltages of Example 2 and Comparative Example 1 at the same current density value, it was seen that the electrode catalyst according to Example 2 moved higher by approximately 50 mV, and this indicates that the electrode catalyst according to Example 2 exhibits more superior activity compared to the electrode catalyst of Comparative Example 1.

Furthermore, the following Table 1 lists current values per 1 g of metals included in the electrode catalysts according to Example 2 and Comparative Example 1. As seen from the following Table 1, the electrode catalyst according to Example 2 had a higher current value at the same voltage compared to the electrode catalyst according to Comparative Example 1.

TABLE 1

|  | Example 2 | Comparative Example 1 |
|---|---|---|
| Mass Activity (A/g metal) @ 0.8 V | 44.94 | 27.94 |

Example 3

Measurement on Durability of Electrode Catalyst

The same working electrode and catalyst layer as in Example 2 were used. Furthermore, using a 0.1 M $HClO_4$ solution as an electrolyte liquid, a hydrogen adsorption peak area was measured after repeating cyclic voltammetry 1,000 times at a rate of 50 mV/s in a 0 V to 1.2 V range based on a normal hydrogen electrode (NHE). An electrochemical surface area (ECSA) of Pt was calculated from the hydrogen adsorption peak area using the equation shown below.

$$ECSA[m_{Pt}^2/g_{Pt}] = \frac{\text{Charge}\left[Q_H, \frac{C}{cm_{geo}^2}\right]}{2.1\left[\frac{C}{m_{Pt}^2}\right] \times \text{catalyst weight}\left[\frac{g_{Pt}}{cm_{geo}^2}\right]}$$

$Q_H$ is a hydrogen adsorption peak area.

The following Table 2 lists the ECSA of the electrode catalyst according to Example 3.

TABLE 2

| | Initial ECSA | ECSA after Repeating CV 1,000 Times |
|---|---|---|
| ECSA ($m^2$/g Pt) | 19.09 | 15.43 |

FIG. 6 shows a result of measuring durability of the electrode catalyst according to Example 3. Specifically, FIG. 6 shows a result of repeating cyclic voltammetry (CV) 1,000 times on the electrode catalyst according to Example 3.

Comparative Example 2

Measurement on Durability of Electrode Catalyst

Durability of the electrode catalyst according to Comparative Example 1 was measured in the same manner as in Example 3.

FIG. 7 shows a result of measuring durability of the electrode catalyst according to Comparative Example 2. Specifically, FIG. 7 shows a result of repeating cyclic voltammetry (CV) 1,000 times on the electrode catalyst according to Comparative Example 2.

The following Table 3 lists the ECSA of the electrode catalyst according to Comparative Example 2.

TABLE 3

| | Initial ECSA | ECSA after Repeating CV 1,000 Times |
|---|---|---|
| ECSA ($m^2$/g Pt) | 58.82 | 24.92 |

A decrease in the ECSA value occurring during the operation of a fuel cell is due to a sintering action of catalyst particles during the reaction, and when the ECSA decreases, catalyst activity declines since the reaction area of the catalyst decreases.

As can be seen from FIGS. 6 and 7, and Tables 2 and 3, the ECSA after repeating CV tests 1,000 times decreased by approximately 58% in Comparative Example 2 whereas the ECSA decreased by approximately 20% in Example 3. From such a result, it can be seen that the electrode catalyst according to Example 3 has more superior durability compared to the electrode catalyst according to Comparative Example 2, a commercial catalyst.

REFERENCE NUMERAL

1: Fuel Cell
10: Membrane Electrode Assembly
11: Unit Cell
12: Holder
100: Electrolyte Membrane
110, 110': Catalyst Layers
120, 120': Gas Diffusion Layers
121, 121': Micropore Layers
122, 122': Supports

The invention claimed is:

1. A fuel cell comprising:
a cathode;
an anode; and
an electrolyte membrane provided between the cathode and the anode,
wherein at least one of the cathode and the anode includes an electrode catalyst,
wherein the electrode catalyst includes hollow metal nanoparticles including a hollow core unit and a shell unit including a first metal and a second metal,
wherein the hollow metal nanoparticles have an average particle diameter of 30 nm or less,
wherein the first metal is platinum (Pt) and the second metal is selected from the group consisting of Ni (nickel), cobalt (Co), iron (Fe), and copper (Cu),
wherein at least two major peaks representing atomic percentage of at least any one of the first metal and the second metal are present in elemental analysis data of the hollow metal nanoparticles,
wherein at least one major peak representing the atomic percentage is present within a 30% region from one end point of the particle diameter, and at least another major peak representing the atomic percentage is present within a 30% region from another end point of the particle diameter, and
wherein the shell unit is a single layer comprising the first metal and the second metal or the shell unit comprises a first shell formed with the first metal and a second shell formed with the second metal.

2. The fuel cell of claim 1, wherein the shell unit of the hollow metal nanoparticles has a thickness of 5 nm or less.

3. The fuel cell of claim 1, wherein the hollow core has a volume of 50% by volume or greater with respect to a total volume of the hollow metal nanoparticles.

4. The fuel cell of claim 1, wherein particle diameters of the hollow metal nanoparticles are within a 80% to 120% range of the average particle diameter of the hollow metal nanoparticles.

5. The fuel cell of claim 1, wherein the electrode catalyst includes a carrier-hollow metal nanoparticle complex in which the hollow metal nanoparticles are supported on a carrier.

6. The fuel cell of claim 1, wherein at least one major peak representing atomic percentage of the first metal is present within a 30% region from one end point of the particle diameter, and at least one another major peak representing atomic percentage of the first metal is present within a 30% region from the other end point of the particle diameter.

7. The fuel cell of claim 1, wherein at least one major peak representing atomic percentage of the second metal is present within a 30% region from one end point of the particle diameter, and at least one another major peak representing atomic percentage of the second metal is present within a 30% region from the other end point of the particle diameter.

8. The fuel cell of claim 1, wherein the hollow metal nanoparticles have a globular shape.

9. A method for manufacturing a fuel cell comprising:
preparing an electrode catalyst including hollow metal nanoparticles that include a hollow core unit and a shell unit including a first metal and a second metal;
preparing an electrolyte membrane;
forming a cathode on one surface of the electrolyte membrane; and
forming an anode on the other side of the electrolyte membrane,
wherein the hollow metal nanoparticles have an average particle diameter of 30 nm or less, and at least one of the forming of a cathode and the forming of an anode uses the electrode catalyst,
wherein the first metal is platinum (Pt) and the second metal is selected from the group consisting of Ni (nickel), cobalt (Co), iron (Fe), and copper (Cu), wherein at least two major peaks representing atomic percentage of at least any one of the first metal and the second metal are present in elemental analysis data of the hollow metal nanoparticles, wherein at least one major peak representing the atomic percentage is present within a 30% region from one end point of the particle diameter, and at least another major peak representing the atomic percentage is present within a 30% region from another end point of the particle diameter, and wherein the shell unit is formed as a single layer by mixing the first metal and the second metal or the shell unit is formed to include a first shell formed with the first metal and a second shell formed with the second metal.

10. The method for manufacturing a fuel cell of claim 9, wherein the preparing of an electrode catalyst includes forming a solution by adding a first metal salt, a second metal salt and a surfactant to a solvent; and forming hollow metal nanoparticles by adding a reducing agent to the solution, the forming of a solution includes the surfactant forming a micelle, and the first metal salt and the second metal salt surrounding outside the micelle, and the forming of hollow metal nanoparticles includes the micelle region being formed to a cavity.

11. The method for manufacturing a fuel cell of claim 9, wherein the preparing of an electrode catalyst includes forming a solution by adding a first metal salt, a second metal salt and a surfactant to a solvent; forming hollow metal nanoparticles by adding a reducing agent to the solution; and forming a carrier-hollow metal nanoparticle complex by supporting the hollow metal nanoparticles on a carrier, the forming of a solution includes the surfactant forming a micelle, and the first metal salt and the second metal salt surrounding outside the micelle, and the forming of hollow metal nanoparticles includes the micelle region being formed to a cavity.

12. The method for manufacturing a fuel cell of claim 9, wherein the preparing of an electrode catalyst includes forming a solution by adding a first metal salt, a second metal salt and a surfactant to a solvent; adding a carrier to the solution for dispersion; and forming a carrier-hollow metal nanoparticle complex in which the hollow metal nanoparticles are supported on the carrier by adding a reducing agent to the solution, the forming of a solution includes the surfactant forming a micelle, and the first metal salt and the second metal salt surrounding outside the micelle, and the hollow metal nanoparticles includes the micelle region being formed to a cavity.

13. The method for manufacturing a fuel cell of claim 10, wherein the first metal salt and the second metal salt have a molar ratio of 1:5 to 10:1.

14. The method for manufacturing a fuel cell of claim 10, wherein a concentration of the surfactant is greater than or equal to 1 time and less than or equal to 5 times of a critical micelle concentration (CMC) for the solvent.

15. The method for manufacturing a fuel cell of claim 10, wherein the solvent includes water.

16. The method for manufacturing a fuel cell of claim 10, wherein the preparing of an electrode catalyst is carried out at room temperature.

* * * * *